US008644850B2

(12) United States Patent
Faragher

(10) Patent No.: US 8,644,850 B2
(45) Date of Patent: Feb. 4, 2014

(54) RADIO NAVIGATION

(75) Inventor: Ramsey Michael Faragher, Huyton (GB)

(73) Assignee: BAE Systems PLC, London (GB)

( * ) Notice: Subject to any disclaimer, the term of this patent is extended or adjusted under 35 U.S.C. 154(b) by 0 days.

(21) Appl. No.: 13/499,945

(22) PCT Filed: Oct. 4, 2010

(86) PCT No.: PCT/GB2010/051653
§ 371 (c)(1),
(2), (4) Date: Apr. 3, 2012

(87) PCT Pub. No.: WO2011/042725
PCT Pub. Date: Apr. 14, 2011

(65) Prior Publication Data
US 2012/0196622 A1 Aug. 2, 2012

(30) Foreign Application Priority Data

| Oct. 5, 2009 | (EP) | 09275091 |
| Oct. 5, 2009 | (EP) | 09275092 |
| Oct. 5, 2009 | (GB) | 0917384.0 |
| Oct. 5, 2009 | (GB) | 0917388.1 |
| Nov. 27, 2009 | (EP) | 09177349 |
| Nov. 27, 2009 | (GB) | 0920772.1 |
| Jun. 7, 2010 | (EP) | 10275059 |
| Jun. 7, 2010 | (GB) | 1009486.0 |
| Aug. 10, 2010 | (GB) | 1013413.8 |

(51) Int. Cl.
*H04W 24/00* (2009.01)

(52) U.S. Cl.
USPC ..................................................... 455/456.1

(58) Field of Classification Search
USPC .............. 455/404.2, 414.1–414.2, 456.1–457
See application file for complete search history.

(56) References Cited

U.S. PATENT DOCUMENTS

| 4,024,383 A | 5/1977 | Beasley |
| 5,045,861 A | 9/1991 | Duffett-Smith |

(Continued)

FOREIGN PATENT DOCUMENTS

| DE | 101 11 967 A1 | 10/2001 |
| EP | 0 303 371 A1 | 2/1989 |

(Continued)

OTHER PUBLICATIONS

Notification Concerning Transmittal of International Preliminary Report on Patentability (Forms PCT/IB/326 and PCT/IB/373) and the Written Opinion of the International Searching Authority (Form PCT/ISA/237) issued on Apr. 19, 2012, in corresponding International Application No. PCT/GB2010/051653. (10 Pages).
Notification Concerning Transmittal of International Preliminary Report on Patentability (Forms PCT/IB/326 and PCT/IB/373) and the Written Opinion of the International Searching Authority (Form PCT/ISA/237) issued on Apr. 19, 2012, in corresponding International Application No. PCT/GB2010/051657. (10 Pages).

(Continued)

*Primary Examiner* — Kashif Siddiqui
(74) *Attorney, Agent, or Firm* — Buchanan Ingersoll & Rooney PC

(57) ABSTRACT

Methods and systems for estimating the position of a radio signal receiver are described. The position of a first stationary radio signal transmitter is estimated using a primary set of positioning resources available to the receiver. Once the position of the first transmitter has been determined, it is added to a secondary set of positioning resources available to the receiver. If the primary set of positioning resources is ineffectual, the secondary set of positioning resources may be used to estimate the position of the receiver.

14 Claims, 7 Drawing Sheets

(56) References Cited

U.S. PATENT DOCUMENTS

| | | |
|---|---|---|
| 5,502,450 A | 3/1996 | Zablotney et al. |
| 6,100,845 A | 8/2000 | Rose |
| 6,445,927 B1 | 9/2002 | King et al. |
| 6,567,669 B1 | 5/2003 | Groome |
| 6,868,073 B1 | 3/2005 | Carrender |
| 6,876,325 B1 | 4/2005 | Coluzzi et al. |
| 7,228,139 B1 | 6/2007 | Wortham |
| 7,388,541 B1 | 6/2008 | Yang |
| 7,471,241 B1 | 12/2008 | Yang |
| 2001/0022558 A1 | 9/2001 | Karr et al. |
| 2002/0126046 A1 | 9/2002 | Counselman, III et al. |
| 2003/0022675 A1 | 1/2003 | Mergler |
| 2003/0048731 A1 | 3/2003 | Ozaki |
| 2003/0125046 A1 | 7/2003 | Riley et al. |
| 2003/0125875 A1 | 7/2003 | Lee |
| 2003/0176196 A1 | 9/2003 | Hall et al. |
| 2003/0222820 A1 | 12/2003 | Karr et al. |
| 2004/0102198 A1 | 5/2004 | Diener et al. |
| 2004/0242234 A1 | 12/2004 | Klenner |
| 2005/0156782 A1* | 7/2005 | Whelan et al. ........... 342/357.16 |
| 2005/0184907 A1 | 8/2005 | Hall et al. |
| 2005/0197769 A1* | 9/2005 | Soehren et al. ............... 701/220 |
| 2005/0288033 A1 | 12/2005 | McNew et al. |
| 2006/0181454 A1 | 8/2006 | Nichols |
| 2006/0211430 A1 | 9/2006 | Persico |
| 2008/0032706 A1 | 2/2008 | Sheynblat et al. |
| 2008/0113672 A1 | 5/2008 | Karr et al. |
| 2008/0167049 A1 | 7/2008 | Karr et al. |
| 2008/0234930 A1 | 9/2008 | Cheok et al. |
| 2008/0242310 A1 | 10/2008 | Vassilovski |
| 2009/0115658 A1 | 5/2009 | Zimmerman et al. |
| 2009/0156229 A1 | 6/2009 | Hein et al. |

FOREIGN PATENT DOCUMENTS

| | | |
|---|---|---|
| EP | 0 437 822 A2 | 7/1991 |
| EP | 1 271 178 A2 | 1/2003 |
| EP | 1 361 773 A1 | 11/2003 |
| EP | 1 942 351 A1 | 7/2008 |
| GB | 1013413 A | 12/1965 |
| GB | 2 254 508 A | 10/1992 |
| GB | 2 359 699 A | 8/2001 |
| GB | 2 380 793 A | 4/2003 |
| JP | 58-200179 A | 11/1983 |
| JP | 2009-300146 A | 12/2009 |
| WO | WO 02/09107 A2 | 1/2002 |
| WO | WO 02/23215 A1 | 3/2002 |
| WO | WO 02/33435 A2 | 4/2002 |
| WO | WO 02/069507 A2 | 9/2002 |
| WO | WO 03/008990 A2 | 1/2003 |
| WO | WO 03/010552 A2 | 2/2003 |
| WO | WO 03/058985 A2 | 7/2003 |
| WO | WO 2004/074779 A1 | 9/2004 |
| WO | WO 2006/099632 A2 | 9/2006 |
| WO | WO 2007/001660 A2 | 1/2007 |
| WO | WO 2008/116168 A1 | 9/2008 |
| WO | WO 2008/118621 A1 | 10/2008 |

OTHER PUBLICATIONS

Notification Concerning Transmittal of International Preliminary Report on Patentability (Forms PCT/IB/326 and PCT/IB/373) and the Written Opinion of the International Searching Authority (Form PCT/ISA/237) issued on Apr. 19, 2012, in corresponding International Application No. PCT/GB2010/051655. (11 Pages).
Notification Concerning Transmittal of International Preliminary Report on Patentability (Forms PCT/IB/326 and PCT/IB/373) and the Written Opinion of the International Searching Authority (Form PCT/ISA/237) issued on Apr. 19, 2012, in corresponding International Application No. PCT/GB2010/051654. (11 Pages).
International Search Report (PCT/ISA/210) issued on Jul. 7, 2011, by British Patent Office as the International Searching Authority for International Application No. PCT/GB2010/051653.
Written Opinion isssued on Jul. 7, 2011, by European Patent Office for Application No. PCT/GB210/051653.
International Search Report (PCT/ISA/210) issued on Mar. 22, 2011, by British Patent Office as the International Searching Authority for International Application No. PCT/GB2010/051654.
International Search Report (PCT/ISA/210) issued on Oct. 19, 2011, by British Patent Office as the International Searching Authority for International Application No. PCT/GB2010/051655.
International Search Report (PCT/ISA/210) issued on Feb. 1, 2011, by British Patent Office as the International Searching Authority for International Application No. PCT/GB2010/051657.
Search Report issued on Mar. 15, 2010, by European Patent Office for Application No. 09275091.8.
Search Report issued on Feb. 5, 2010, by British Patent Office for Application No. 0917384.0.
Search Report issued on Mar. 8, 2010, by British Patent Office for Application No. 0917388.1.
Search Report issued on Apr. 26, 2010, by European Patent Office for Application No. 09275092.6.
Search Report issued on Dec. 17, 2010, by British Patent Office for Application No. 1013413.8.
Search Report issued on Oct. 7, 2010, by British Patent Office for Application No. 1009486.0.
Search Report issued on Feb. 23, 2011, by European Patent Office for Application No. 10275059.3.
Search Report issued on Mar. 24, 2010, by British Patent Office for Application No. 0920772.1.
Search Report issued on Oct. 6, 2010, by European Patent Office for Application No. 09177349.9.
Particle Filter from Wikipedia, XP-002628464, Aug. 23, 2005, pp. 1-3.
Yang et al., "Self-Calibrating Position Location Using Signals of Opportunity", XP007917393, Sep. 2009, pp. 1055-1063.

* cited by examiner

RADIO NAVIGATION

FIELD OF THE INVENTION

The present invention relates to a method and system for estimating the position of a radio signal receiver. In particular, the method and system can utilise opportunistic radio signals, for example, television, cellular, wi-fi, public radio and the like as potential positioning resources.

BACKGROUND TO THE INVENTION

A commonly used resource for outdoor navigation is satellite positioning technology, otherwise known as a Global Navigation Satellite System (GNSS). One example of a fully operational GNSS is the United States NAVSTAR Global Positioning System (GPS)—which will be referred to below when generally discussing satellite positioning technology. However, it will be appreciated that satellite positioning technologies other than GPS may be used in its place.

The operation of GPS is well known in the art, and generally employs a GPS receiver arranged to receive signals from a number of GPS satellites. Each satellite broadcasts its own location and providing the GPS receiver can receive the broadcasted signals from a sufficient number and distribution of satellites, the GPS receiver can infer its own position.

An entity wanting to self-localise may therefore employ a positioning system having a GPS receiver. However, in the event that a GPS receiver is not able to infer its position—for example due to signal interference, then it may be possible for the positioning system to make use of other positioning resources.

An Inertial Measurement Unit (IMU) is one example of such a positioning resource. An IMU can be used to perform a technique known as dead reckoning to track the relative movement of an entity from a known start point. As a further example, if a positioning system is being used in a car, and the car enters a tunnel (at which point the GPS signals are lost), information from the car's odometer can be used to track the distance travelled through the tunnel. Additionally, sensors of an inertial measurement unit such as attitude sensors (e.g. digital compass), gyroscopes and the like can be used to provide additional information to the positioning system as to the likely position relative to the known start point.

However, without an external point of reference, the errors caused by the inaccuracies of the sensors build up over time. Whilst very accurate sensors can be used to determine position to a high degree of accuracy, such solutions can be expensive and heavy, and in any case, all positioning systems relying solely on the technique of dead reckoning suffer from drift. An Inertial Navigation System (INS) combines data from an IMU with regular updates from a GPS receiver in order to constrain this drift and provide accurate navigation information at a high update rate.

Another type of positioning resource that can be used is a radio signal positioning system which is used to navigate via radio signals other than those transmitted by GPS satellites—for example, using radio signals transmitted by cellular telephone base stations, television and radio transmitters and the like. The signals transmitted by these transmitters generally have distinguishing characteristics that can be exploited by a suitable positioning system for navigation. In particular, the signals transmitted may contain unique code words and this together with information about the location of each of these transmitters can be used to determine the position of an entity using known localisation techniques such as multilateration and Enhanced Observed Time Difference (EOTD).

However, a significant problem is that the positions of the transmitters need to be known by the radio positioning system for each transmitter to be successfully used as a point of reference during navigation. This information can be stored in advance by the radio positioning system or broadcasted by the transmitter itself. However, when locations of the radio transmitters are not known or at least are not known to a sufficient degree of accuracy, the radio transmitter cannot be used for navigation.

It is an object of the present invention to alleviate these problems, at least in part.

DISCLOSURE OF THE INVENTION

According to a first aspect of the present invention there is provided a method of estimating the position of a radio signal receiver comprising;

estimating the position of a first stationary radio signal transmitter using a primary set of positioning resources available to the receiver;

adding the position of the first transmitter to a secondary set of positioning resources available to the receiver; and using the secondary set of positioning resources to estimate the position of the receiver.

Advantageously, the method can maximise the speed, reliability and accuracy of estimating the position of a receiver over and above that possible using the original (primary) set of positioning resources. This is achieved by being receptive to signals from a first transmitter that has an unknown or uncertain position—and therefore is not part of the primary set of positioning resources, determining the position of that transmitter—thereby turning it into a usable positioning resource, and adding it to a secondary set of positioning resources. (The secondary set of positioning resources may comprise the primary set of positioning resources plus the newly added first transmitter).

The transmitter, newly added as a positioning resource can thus act to complement the existing set of positioning resources to better aid the estimation of the position of the receiver. This method is particularly advantageous if the receiver is moving through an environment in which its original set of positioning resources are rendered unusable, as this method can allow navigation solely on the basis of a newly acquired set of positioning resources, separate from the original set. That is to say, the secondary set of positioning resources may be used to estimate the position of the receiver when the primary set of positioning resources is ineffectual.

For example, if the primary set of positioning resources consists of a GPS system, and the receiver enters into an area, for example under dense foliage, where the number of GPS satellites signals received alone is not sufficient for accurate localisation, using a newly acquired positioning resource in the form of the first transmitter can augment what little information is received from the GPS satellites to allow otherwise impossible, or at least unreliable localisation.

In addition to this, the secondary set of positioning resources may be used to complement the primary set of positioning resources to allow the localisation provided by the primary set of positioning resources to be enhanced. For example, the position of the receiver may be determined to a greater degree of accuracy, and/or the rate at which the position of the receiver is determined can be increased (which is particularly useful if the receiver is moving quickly).

Preferably, the position estimation is carried out without two-way communication between the radio signal receiver and the first stationary radio signal transmitter and/or the primary set of positioning resources.

A further advantage is that the estimation of the location of the receiver can be achieved passively—i.e. without two-way communication. This can reduce the technical complexity of the receiver as it is not required to transmit information—only receive. In addition, this arrangement increases the versatility of the system as a whole—in particular promoting the mobility of the receiver. Passive localisation is also an important consideration in certain applications where the transmission of signals from the receiver is undesirable—for example, because of signal interference with other devices attempting to self localise, or if it is desirable for the receiver to remain undetectable.

Preferably, estimating the position of the first transmitter using a primary set of positioning resources comprises correlating different sets of information, each set of information corresponding to a different relative position of the receiver to the first transmitter.

Preferably, each set of information comprises;

radio signal data derived from radio signals received by the receiver from the first transmitter at each respective relative position; and positioning data derived from the primary set of positioning resources containing information about the position of the receiver at each respective relative position.

Each set of information may comprise radio signal data obtained from the primary set of positioning resources. The primary set of positioning resources may comprise a reference receiver separate from, but in communication with the receiver.

Preferably, radio signal data comprises the radio signal time of flight.

Preferably, the radio signal time of flight is determined by calculating the clock bias between the radio signal receiver and the radio signal transmitter.

Preferably, each set of information comprises values for one or more parameters in the equation:

$$ct_{i,j} = |r_i - b_j| + \epsilon_i - \alpha_j$$

where:

c is the known speed of the radio waves;

$t_{i,j}$ represents the arrival time of the transmission from the $j^{th}$ transmitter at the $i^{th}$ receiver location;

the vectors $r_i$ and $b_j$ are positions of the $i^{th}$ receiver location and $j^{th}$ transmitter respectively (these may be two-dimensional or three-dimensional as required);

$\epsilon_i$ represents the combined initial clock bias and subsequent clock drift of the receiver, and;

$\alpha_j$ represents the combined initial clock bias and subsequent clock drift of a given transmitter.

Advantageously, additional sets of information can be collected and correlated to refine the estimated position of the transmitter. Generally, during estimation of the position of the first transmitter, multiple sets of information are gathered—a different set for each different relative position of the receiver and transmitter. The different sets can then be correlated with one another to improve the estimate of the position of the transmitter. As the number of sets of information increase, the accuracy of the estimated position of the transmitter also increases.

Preferably, input data correlation comprises applying a Bayesian estimation filter.

Preferably, said Bayesian estimation filter is applied to simultaneously improve the position estimates of the radio signal receiver and the first stationary radio signal transmitter.

Advantageously, the use of a Bayesian estimation filter allows the position estimates of the receiver and transmitter to be determined and improved simultaneously. It will be noted that there are not separate stages of 'surveying' and 'receiver positioning'—the calculation is simultaneously achieved in one algorithmic step. In particular, data such as GPS position data, opportunistic radio signal data is processed as part of a state vector in one cycle. Thus, even when only transmitters with low accuracy position estimates are available, the positioning process can continue without failure or divergence producing estimates of receiver location and improving estimates of transmitter locations. For example, if a given transmitters location error is low compared with a radio signal receivers location error, then the information received and associated with the corresponding radio measurement goes mainly into improving the estimate of the receiver's location. If the transmitter's location error is high compared to the current receiver location error then the new radio measurement goes mainly into improving the transmitter location estimate based on the current receiver estimate accuracy. This behaviour is controlled by a Kalman filter (or other Bayesian estimation filter) processing a large state vector and covariance matrix containing all the relevant receiver and transmitter parameters (locations, etc). The entire state vector and covariance matrix is processed in each measurement update, such that determining receiver and transmitter locations occurs simultaneously in one step, not as separate stages or processes.

It will be appreciated that the simultaneity of the receiver and transmitter location estimate updates are distinguished from prior known systems that employ a distinct linear process (where either the transmitter locations, or the receiver locations are solved at any one time). The simultaneous update feature means that a set of radio measurements are captured at one time epoch and in one processing step the estimates of all of the uncertain variables (e.g. receiver and all transmitter locations) are updated, preferably by an amount dependant on the current error associated with each object's location estimate. In particular, the Bayesian filter's state vector contents (receiver position estimates, transmitters position estimates, local clock error, transmitter clock errors etc) allows a single algorithmic step to be applied when a radio signal measurements are taken at one instant in time. One algorithm can be used for all situations (thereby reducing system complexity). For example, when the transmitters are well known the corresponding error values are small, and so the Bayesian update information goes mainly into correcting the receiver position estimate as much as possible and driving down the corresponding error. Regardless of the other scenarios—e.g. receiver well known and transmitters poorly known; and everything known poorly—the algorithmic step is identical, there is no two stage process algorithmically of "find transmitters" then later "find receiver". The size of the error associated with a given parameter in the state vector is what decides how much information from a given radio measurement is going into updating which parameter.

Furthermore, the use of a Bayesian estimation filter has a closed loop advantage. In particular, data that has been collected in the past to reach only a limited determination can again be used to make a better determination once additional data has be gathered. As such, it is preferred that the data collected and used to estimate the position of the receiver and transmitters is stored for reuse in making a further estimate of the receiver and transmitter locations at a later time.

The Bayesian estimation filter may comprise a Kalman-based filter or a particle filter.

Advantageously, the Kalman filter is the optimum filter for linear systems with Gaussian noise, while particle filters can be suitably tuned to account for non-linearity and non-Gaussian noise sources. Extensions to the Kalman filter, such as the Extended Kalman Filter and the Unscented Kalman Filter provide better performance for non-linear systems. Alternatively a recursive Bayesian Estimator may be derived for the system.

Preferably, the application of a Bayesian estimation filter comprises loading the filter with error models associated with the transmitter and/or receiver clocks.

Preferably, the application of a Bayesian estimation filter comprises loading the filter with information from an inertial measurement unit about the movement of the receiver relative to the transmitter.

Preferably, estimating the position of the first transmitter using a primary set of positioning resources comprises maintaining multiple instances of differently correlated information sets in parallel and then choosing the instance resulting in the most likely position of the transmitter.

Preferably the position estimates will be determined using a Simultaneous Localisation and Mapping (SLAM) framework, allowing correlations between the estimates of the locations of the transmitters and receiver to be strongly maintained.

It will be understood that there are a number of different ways of correlating data, for example using different processing algorithms, or by correlating a set of data in different sequences. Depending on the algorithm used, the output of the algorithm will either diverge or converge towards a single answer (i.e. the estimated position for transmitter will become refined). However, convergence towards a single answer may not necessarily be immediate, and so it is advantageous to maintain parallel instances of differently correlated information sets. Thus, as additional radio signal data and/or positioning data is obtained, the option can be reserved of using the algorithm that results in the best estimated position.

Preferably, the first set of positioning resources comprises a global satellite navigation system and/or an inertial measurement unit.

Advantageously, different positioning resources can be used to complement one another.

Preferably, the receiver is arranged to receive radio signals of different types, for example, television, cellular, wi-fi and public radio signals. Preferably, the different types of radio signals are unsynchronised with one another and/or the radio signal receiver. Preferably, one or more of the radio signal transmitters that are used to determine a position estimate do not transmit information about their own location.

Advantageously, this can improve the chance of estimating the position of the receiver as this maximises the signals of opportunity from which receiver can determine its location, as part of the secondary set of positioning resources. Furthermore, it will be appreciated that as non-synchronised, opportunistic radio signals are utilised, then it may not be possible for there to be two way communication between the radio signal receiver and the transmitters. Nonetheless, the method advantageously allows estimates of the positions of the radio signal receivers to be not only determined, but also improved over time.

Preferably, the receiver is arranged to determine the type of the radio signal being transmitted from the first transmitter by analysing the signal for radio signal characteristics.

Radio signal characteristics may include frequency, bandwidth, the modulation scheme, the interleaving scheme, the repeated code word, and/or the repeat rate of the code word. These are generally publicly available, and can be pre-stored in a database for reference by a navigation system on picking up an unknown radio signal for use in correlating different sets of information. However, in the case that the radio signal characteristics are not known, the navigation system may be advantageously arranged to work out such characteristics by analysing the radio signal. This can be achieved whilst the radio signal receiver is stationary. During this time, the received radio signal data can be analysed to spot regularly repeating patterns (e.g. code words) and the repeat rate of these code words. Whilst this can take longer than simply looking up the code words and repeat rates in a database, this makes the system more flexible and amenable to receiving and effectively utilising radio signals that are not specified in the database.

Preferably, the radio signals used for radio-localisation are time-based, using code words.

Preferably, the method comprises estimating the position of further transmitters, and adding their positions to the secondary set of positioning resources.

Advantageously, having a plurality of transmitters added to the secondary set of positioning resources can further improve the speed, accuracy and reliability of the estimation of the position of the receiver. For example, the original set of positioning resources can become redundant in favour of the newly established group of transmitters as positioning resources, which may serve as better positioning resources—for example, due to increased resolution, better signal characteristics (e.g. allowing an increased update speed of localisation) and/or because of being more optimally distributed in the environment being navigated by the receiver.

Preferably, where the method comprises estimating the position of further transmitters, and the further transmitters transmit radio signals of different types, correlating different sets of information comprises determining values for one or more parameters in the equation:

$$c \cdot (\Delta t_{i,j}) = |r_i - b_j| + \epsilon_i - \alpha_j$$

where:
c is the known speed of the radio waves;
$t_{i,j}$ represents the arrival time of the transmission from the $j^{th}$ transmitter at the $i^{th}$ receiver location and $\Delta t_{i,j} = t_{i,j} - t_{i,j}^{pred}$.
the vectors $r_i$ and $b_j$ are positions of the $i^{th}$ receiver location and $j^{th}$ transmitter respectively;
$\epsilon_i$ represents the combined initial clock bias and subsequent clock drift of the receiver, and;
$\alpha_j$ represents the combined initial clock bias and subsequent clock drift of a given transmitter.

Preferably, correlating different sets of information comprises determining values for every parameter in the equation:

$$c \cdot (\Delta t_{i,j}) = |r_i - b_j| + \epsilon_i - \alpha_j$$

According to a second aspect of the present invention there is provided a method of estimating the position of a first stationary radio signal transmitter having an unknown position at a radio signal receiver comprising;
correlating different sets of information, each set of information corresponding to a different relative position of the receiver to the first transmitter, each set of information comprising:
radio signal data derived from radio signals received by the receiver from the first transmitter at each respective relative position; and
positioning data derived from a primary set of positioning resources available to the receiver containing information about the position of the receiver at each respective relative position.

According to a third aspect of the present invention there is provided an apparatus, for example a navigation system, arranged to carry out the method according to the first and second aspects of the present invention. The invention also extends to a computer program product (carrier medium) comprising computer readable code that when loaded onto a computer causes it to perform the methods of the first or second aspects of the present invention.

It will be understood that features of the different aspects of the present invention may be combined where context allows.

BRIEF DESCRIPTION OF THE FIGURES

Specific embodiments of the present invention will now be described, by way of example only, with reference to the following drawings in which.

DETAILED DESCRIPTION OF THE PREFERRED EMBODIMENT

Figure 1:
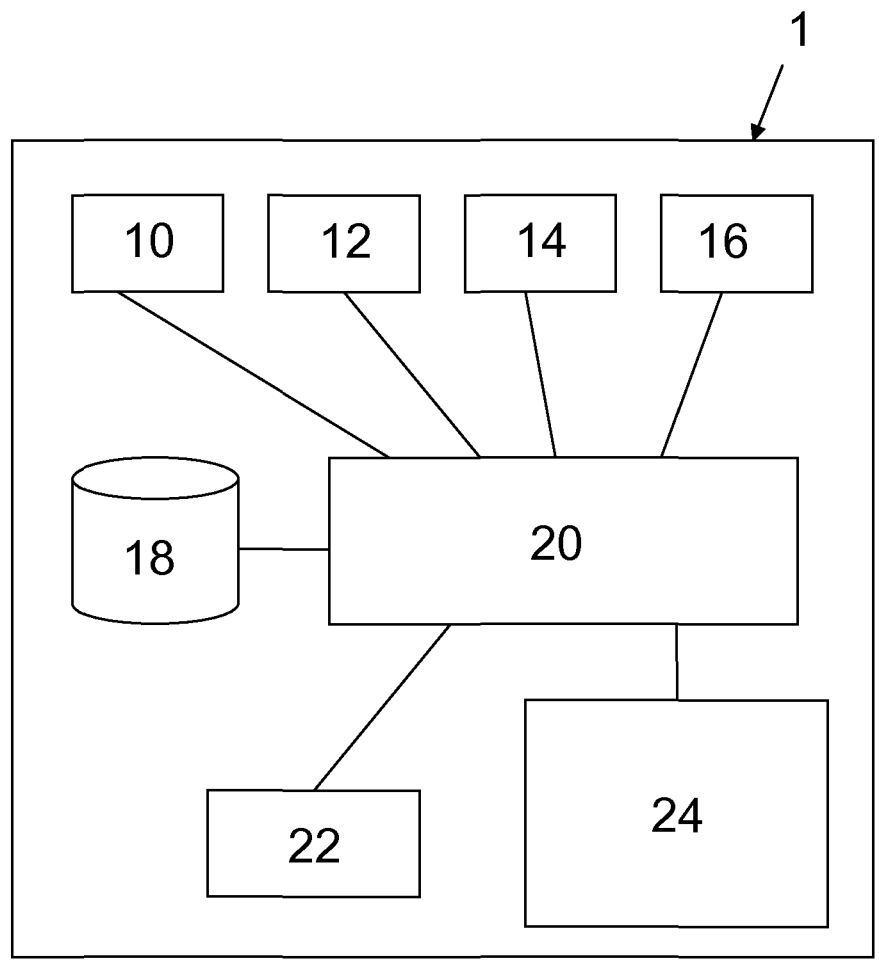
FIG. 1 shows a schematic diagram of a navigation system according to a first aspect of the present invention.

Referring to FIG. 1 there is shown a navigation system 1 according to a first embodiment of the present invention. In the present example, the navigation system 1 is incorporated in a vehicle (not shown).

The navigation system 1 comprises a GPS receiver 10, a GSM receiver 12 and an Inertial Measurement Unit (IMU) 14, an interface module 16, a database 18, a processor 20, a user interface module 22 and a position display module 24.

The GPS receiver 10 and GSM receiver 12 collect data from respective radio signals as is known in the art, and send their data to the processor 20. The processor 20 also receives data from the IMU 14, and optionally, the interface module 16. The interface module 16 is arranged to be connected to other devices, for example receivers arranged to receive radio signals other than GPS and GSM signals. The processor 20 is arranged to store the received data in the database 18. The processor 20 is also arranged to process the data received from input modules 10, 12, 14, 16, and store the resulting processed data in the database 18.

The database 18 also stores map images which are preloaded onto the database 18 and fetched by the processor 20 when needed.

Processed data comprises positional data which, together with the appropriate map images may be outputted by the processor to the position display module 24 which can then display an appropriate map to a user showing the location of navigation system 1 on that map. The user interface 22 can also be used by the user to configure the processor 20, and so the operation of the navigation system 1.

During normal operation (GPS available), the GPS receiver 10 receives GPS radio signals from a number of GPS satellites. Any radio signals that are received are fed to the processor 20 for processing and storage in the database 18.

Using prior known techniques, the processor can use data from the GPS receiver 10 to determine the position of the navigation system 1, and display the position of the navigation system 1 to a user, for example overlaid on a suitable map image.

At the same time, the GSM receiver 12 may receive radio signals from GSM transmitters. Any radio signals received by the GSM receiver 12 are also fed to the processor 20. However, in order to use GSM signals for determining the location of the navigation system 1, the processor 20 needs to have access to information about the location of the transmitters of the radio signals received by the GSM receiver 12. In the event that such information is not in the database 18, and cannot be obtained via an external source (for example, by downloading the information), the unknown location of the relevant GSM transmitter can be determined by the navigation system 1 using its existing positioning resources—i.e. using the data received from the GPS receiver 10.

In particular, the location of the GSM transmitter can be determined by correlating the data obtained from both the GPS receiver and the GSM receiver when the navigation system 1 is at a number of locations relative to the GSM transmitter.

Figure 2:
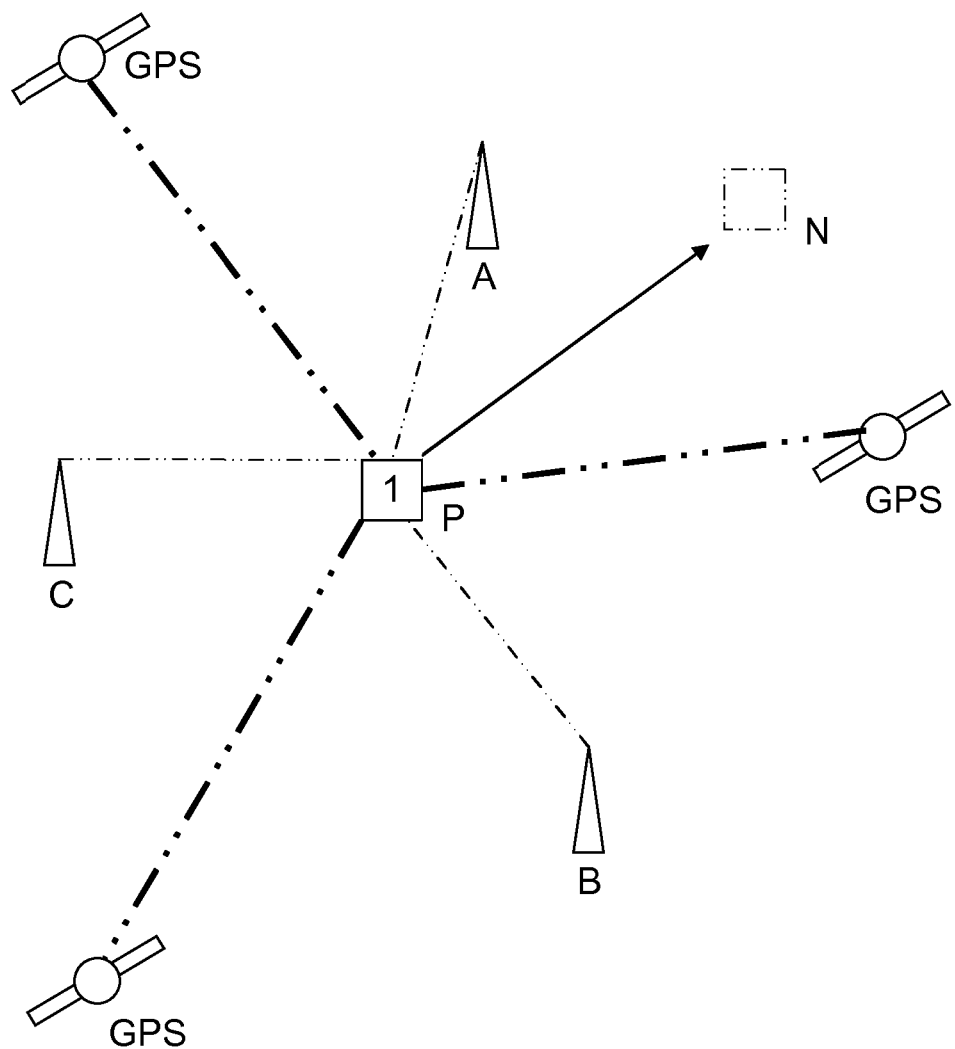
FIG. 2 shows a schematic diagram of the navigation system of FIG. 1, placed relative to GPS and GSM transmitters.

FIG. 2 shows a schematic diagram of the navigation system 1 relative to GPS satellites and ground GSM signal transmitters A, B, C. It is assumed for clarity that the environment that the navigation system traverses is effectively two-dimensional. However, the same concepts are easily adapted for a three-dimensional environment.

When the navigation system 1 is at a first position P relative to GSM transmitter A, it will be able to receive GSM radio signals from that transmitter A that will have a set of signal characteristics particular to that first position P. These signal characteristics can therefore be logged alongside position data derived from the GPS satellites as a first set of information—corresponding to the first position P. The navigation system 1 can then move to a new, second position N relative to the GSM transmitter A, and receive a different set of signal characteristics from the same GSM transmitter A that is particular to the second position N. This can again be logged alongside the GPS position data as a second set of information.

The different sets of information (each corresponding to a different relative position between the navigation system 1 and the GSM transmitter A) can then be correlated with one another to estimate the position of the GSM transmitter A. To improve the accuracy of the estimated position of the GSM transmitter A, further readings of the GSM signals can be taken at further locations, for example, whilst the navigation system is moving. As progressive readings are made and correlated with one another, the location of the GSM transmitter A can be determined with increasing accuracy. When the location of the GSM transmitter A has been determined, it can be added as a positioning resource to the database 18 for future reference by the navigation system 1.

A similar exercise can be performed with GSM signals from further GSM transmitters B and C. The navigation system 1 can receive different GSM signals simultaneously as the GSM signals contain unique signal characteristics (e.g. identification information) distinguishing each GSM signal and thus transmitter A, B and C.

In this way, the navigation system 1 can build up from a primary set of positioning resources (i.e. the GPS satellites alone) a secondary (larger) set of positioning resources (i.e. GSM transmitters A, B and C and also the GPS satellites). Therefore, in the event that the primary set of positioning resources become unavailable, at least in part, the secondary set of positioning resources can be utilised to maintain the ability of the navigation system to self-localise. For example, if there are fewer GPS satellite signals being received by the GPS receiver 10 than necessary to self-localise (using GPS alone) then the navigation system 1 can use additional information provided by the GSM transmitters combined with the available GPS data in an optimal position calculation utilising all available data.

A more detailed description of how the navigation system 1 is able to determine the position of one or more transmitters having initially unknown positions will be now described. It will be understood, however, that the navigation system 1 may be hereinafter referred to generally as a "receiver". For the avoidance of doubt, the processing of data, for example solving equations and the like, is performed by the processor 20 and similarly data values are stored in the database 18.

The calculations that are needed to perform radio localisation are based on the following Equation 1:

$$ct_{i,j} = |r_i - b_j| + \epsilon_i - \alpha_j \quad \text{Equation 1}$$

Where:

c is the known speed of the radio waves;

$t_{i,j}$ represents the arrival time of the transmission from the $j^{th}$ transmitter at the $i^{th}$ receiver location;

the vectors $r_i$ and $b_j$ are positions of the $i^{th}$ receiver location and $j^{th}$ transmitter respectively (these may be two-dimensional or three-dimensional as required);

$\epsilon_i$ represents the combined initial clock bias and subsequent clock drift of the receiver, and;

$\alpha_j$ represents the combined initial clock bias and subsequent clock drift of a given transmitter.

In the two-dimensional situation described with reference to FIG. 2, the receiver position is always known at every position via the GPS satellites. Similarly, the values of t at each of the locations can be determined by receiving the radio signals at each of those locations and measuring the time at which those signal arrived. Therefore, at any position (i.e. for all values of i) the values for r in the above equation (a two-dimensional vector, e.g. x-y coordinates) are known, as are values for t and the constant c.

Starting with the assumption that the transmitter A from which radio signals are being received is synchronised with the receiver (i.e. The values of $\epsilon$ and $\alpha$ are known), then it is possible to determine the position b (also a two-dimensional vector) of the transmitter A simply by receiving radio signals at the two locations P and N shown in FIG. 2. This is because there are only two unknowns in the above Equation 1—i.e. the 'x' and 'y' coordinates of the vector b of the transmitter position.

In particular, at the first position P, the known values as a first set of information are entered into a first instance of Equation 1, and at the second position N the known values as a second set of information is entered into a second instance of Equation 1. These two instances of Equation 1 can then be correlated with one another to derive the two unknown (but constant) values—the 'x' and 'y' coordinates—of the transmitter A. This correlation is achieved by solving the two instances of Equation 1 as a simultaneous equation. Therefore after receiving radio signal data from the transmitter A at two separate locations (P and N) the initially unknown position of the transmitter can be determined, and so it can be added as a positioning resource.

However, the above example relies on the values of $\epsilon$ and $\alpha$ to be known already. Typically, the values of $\epsilon$ and $\alpha$ are not known. This is because the receiver and the transmitter are generally not synchronised. Therefore, it is not possible to solve the simultaneous equations only after taking two readings from the transmitter.

However, if further simultaneous equations are instantiated in respect of further relative positions between the receiver and the transmitter, it becomes possible to solve these unknown values of $\epsilon$ and $\alpha$.

The values of t, $\epsilon$ and $\alpha$ relate to the flight time of the radio signal. By way of background, radio signal flight time is the time taken for the radio signal to travel from the transmitter to the receiver. Once flight time is calculated, distance between the transmitter and receiver can be calculated easily using the knowledge of the speed of the radio wave, which is generally assumed to be constant.

In order to calculate flight time, the clocks of the transmitter and receiver first need to be synchronised. Once synchronised, then the flight time is simply the time interval between when the transmitter transmitted a signal, and when the receiver received it. A predetermined code-word is generally used to mark the start of a received signal. (It will be understood that synchronisation may not necessarily be a hardware synchronisation, but may simply involve an algorithmic synchronisation—for example using timing offset values).

Generally, determining flight time relies on a number of factors associated with the radio signal to be known in advance and also for the radio signal to be of a suitable type. In particular, the frequency and bandwidth of the radio signal must be known, and the radio signal must contain an element (e.g. a code-word, synchronisation burst, identification code etc.) that is repeated in the signal at predictable intervals. For example, standard GSM radio transmitters are known to have a code-word (known as the extended training sequence) repeated at a rate of around twenty code-words per second.

Thus a radio signal that is monitored over time will have a known code-word repeat rate. A time-plot of a constantly monitored signal will result in the code-word appearing at predictable intervals.

Whilst the receiver is stationary at a first location, from the receiver's clock (typically set as 'time zero') the first received code-word will arrive at an initial offset from time zero. Each subsequent code-word will arrive at the offset plus a known time period associated with the repeat rate.

When the receiver has moved to a second position, each received code-word will arrive at a different offset plus the expected time period. In particular, as the receiver moves towards the transmitter, the code-word position will shift earlier in time, and the offset becomes smaller. As the receiver moves away from the transmitter, the code-word positions shift later in time, and the offset becomes larger.

The amount of shift in the offset directly corresponds to the distance travelled by the receiver relative to the stationary transmitter. Therefore, as the receiver knows its own first and second absolute position (e.g. using the GPS system), and also how far towards or away from a transmitter it has travelled, it can, in this two-dimensional example where the values of, $\epsilon$ and $\alpha$ are not known, generally infer the initially unknown heading of a transmitter after two readings (the two readings being taken at two different positions and distances of the receiver relative to the transmitter). After three readings are taken, assuming the readings are taken at geometrically optimal positions, the initially unknown position of a transmitter can be determined. In practice, a number of readings may need to be taken to determine the position of the transmitter accurately enough. This is generally due to factors such as signal noise and interference.

Once the position of the transmitter has been determined in this way, then the clocks of the transmitter and receiver can be synchronised, or at least, the offset between the clocks of the transmitter and receiver can be accounted for, as will be described.

From then on, the receiver can determine the flight time based on a single received signal from the transmitter without the need for supporting additional information such as its own absolute position (the likely assumption being made that the transmitter oscillator is stable, and so does not suffers to much from clock drift).

Note that the values of $\epsilon$ and $\alpha$ are all expressed relative to an imaginary uniform universal clock, which is achieved in practice by setting one of the values to zero and considering the rest relative to that initialisation (typically the first $\epsilon$ value is set to zero).

Therefore, in the two-dimensional example as stated above, it is possible to determine the position vector b of the transmitter A, which is not synchronised with the receiver, after collecting a minimum of three sets of information—corresponding to three separate relative positions of the transmitter and receiver.

Generally speaking, so long as the value being solved for is a constant (which is true of b as the transmitter location does not change, and also true of e and a over the short-term and/or assuming a stable oscillator), and the number of unknowns is not greater than the number of instances of simultaneous equations, then the unknowns are usually solvable.

As mentioned, once the position of a transmitter has been determined, it can be added as a positioning resource. In the example shown in FIG. 2, the positions of three transmitters A, B, C have been determined. Therefore, in the event that the primary positioning resource of the receiver is rendered ineffectual (e.g. because of moving through an urban environment which blocks GPS signals), these transmitters A, B, C (or rather the radio signals transmitted by these transmitters in conjunction with their determined locations) can be used to determine the position of the receiver using Equation 1.

In particular, in the case that GPS becomes unavailable, then Equation 1 is used to solve/determine the position of the receiver 1 as opposed to determining the position of the secondary positioning resources (which is the receiver's normal mode of operation). Therefore, the values of the equation to solve for are now the 'x' and 'y' coordinate of the position vector r of the receiver (for any one given position of that receiver). By receiving radio signals from the three transmitters A, B, C, three simultaneous equations can be instantiated, and the two unknown values relating to the position of the receiver can be determined. Thus, the receiver can determine its position solely from the three transmitters A, B, C.

Radio Signals of Different Types

In the description above, correlation has involved the solving of multiple simultaneous equations, each being an instantiation of the above Equation 1. In particular, the above Equation 1 is suitable for use with radio signals of the same type, and which are synchronised with one another. In the example given in FIG. 2, the GSM transmitters A, B and C are all of the same type, transmit at the same frequency, and are synchronised with one another (much like GPS satellite signals)—and so the multiple instances of Equation 1 can be generated and easily solved.

However, in actuality GSM transmitters are generally not synchronised with one another. In addition, data derived from radio signals may originate from radio signal sources of different types.

In addition, a situation may arise wherein GPS is only partially available, such that signals from only a few satellites are received, and only one or two of the location-resolved GSM transmitters A, B, C are available. In this situation, it should be possible to utilise information from the different radio signal sources (GPS and GSM) to determine the position of the receiver.

However, the correlation of different sets of data from sources of different type is not straightforward and requires a different approach to allow correlation to occur.

In particular radio signal sources of different types (e.g. GPS, GSM, DAB, DVB) tend to have different signal characteristics, such as different arrival times, different repeat rates and different clock drifts and clock biases which hampers the ability to instantiate multiple solvable simultaneous equations. This is mainly due to the timing values being mismatched. However, a modification to Equation 1 allows these differences to be accounted for:

$$c \cdot (\Delta t_{i,j}) = |r_i - b_j| + \epsilon_i - \alpha_j \quad \text{Equation 2}$$

where:

$t_{i,j}$ represents the arrival time of the transmission from the $j^{th}$ transmitter at the $i^{th}$ receiver location and $\Delta t_{i,j} = t_{i,j} - t_{i,j}^{pred}$ The arrival times $t_{i,j}$ are measured by their position in the sampling window of each measurement, whilst the values $t_{i,j}^{pred}$ are calculated using the first set of arrival times $t_{1,j}$, the known synchronisation burst repeat rate, and the known time period between receiver measurements as will be discussed below.

The $t_{i,j}^{pred}$ values represent a remapping of the positions of the synchronisation bursts from the first measurement set $t_{1,j}$ into the sampling window of the new measurement assuming that the receiver does not move between measurements and no other corrections need to be made, for example, there is no clock drift, no multipath etc. This formulation and remapping allows the use of multiple source types with different synchronisation burst repeat rates (e.g. GSM transmitters, DAB transmitters, and DVB transmitters) to be used in a single position calculation, all sharing the same value of $\epsilon_i$ the local clock error corresponding to the sampling window containing all of the available synchronisation signals. Simultaneous measurements of different signal types can therefore be used in a single positioning solution. If only one signal type is used for positioning, then the measurement repeat rate can just be chosen to be a multiple of the synchronisation burst repeat rate and $t_{i,j}^{pred}$ will be a constant for each transmitter.

Figure 3:
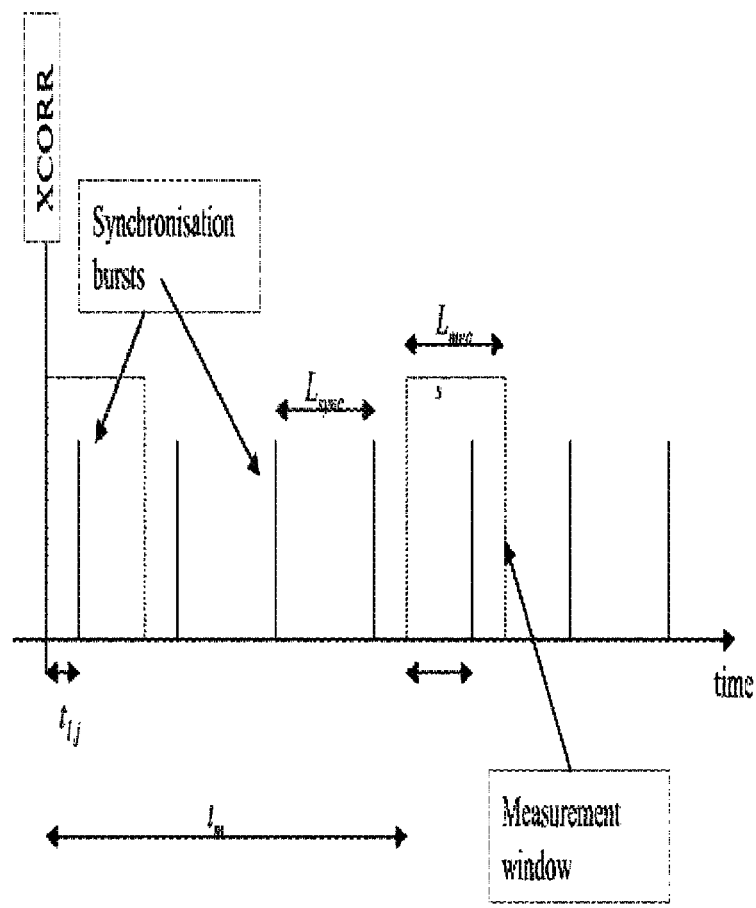
FIG. 3 shows a graph displaying the absolute cross-correlation of signals including synchronisation bursts over time.

The $t_{i,j}^{pred}$ values can be calculated from the following equation, with reference to FIG. 3, which shows XCORR—the absolute cross-correlation of signals including synchronisation bursts over time, when calculating a predicted arrival time of a transmission from a $j^{th}$ transmitter at an $i^{th}$ receiver location, where:

$$t_{i,j}^{pred} = t_{1,j} + \left[ L_{synch} \cdot \text{ceil}\left( \frac{t_m - t_{1,j}}{L_{synch}} \right) \right] - t_m \quad \text{Equation 2a}$$

where $L_{sync}$ is the time period between synchronisation bursts;

$L_{meas}$ is the length of the measurement sampling window;

$t_m$ is the time period between successive measurements; and, ceil( ) is an operator that rounds the operand up to the next integer value.

The formulation above means that for a stationary receiver, perfect clocks at the transmitters and receiver, and no other timing errors, the arrival time of each successive signal $t_{i,j}$ would be identical to the corresponding $t_{i,j}^{pred}$ values. This ensures that the $\epsilon_i$ and $\alpha_j$ values provide direct measurements of the local clock drifts and transmitter clock drifts respectively.

Thus it is possible to correlate information derived from radio signal transmitters of different types to determine unknown parameters such as the location of the receiver and/or the location of those transmitters of different types.

Estimation and Error

So far, the above equations have been used to exemplify the operation of systems in which parameters are either known, or not known (and therefore need to be solved). In these systems, the general approach is to obtain enough readings to instantiate a sufficient number of simultaneous equations (of Equation 1 or Equation 2) to solve the unknown values.

However, in practice, a large number of readings are necessary to account for degrading factors such as signal noise, variable signal geometry, multipath interference and inaccurate estimates of the receiver location derived from the navigation system's positioning resources.

Therefore, in practice, the values of most of the parameters of the above positioning equations are not known as an absolute value, but rather must be expressed as an estimated value, for example as a parameter value and an associated error value.

Referring back to FIG. 2, it will be understood that when the navigation system 1 is first initialised at position P, parameter error values may be relatively high, but then as the navigation system 1 moves to N and then to further locations, and picks up further data to aid with the process of correlation, the errors can be decreased.

Thus, as well as solving for unknown values, it is also possible to maintain a plurality of different sets of information (each corresponding to a different transmitter-receiver location)—which contain parameters with estimated values. These sets can then be correlated with one another, and as further sets are generated and correlated, the error in the estimated values of the parameters may be reduced.

The correlation of data—in particular, solving multiple simultaneous equations containing error values, can be achieved by using a least squares fit approach using a matrix inversion as is known in the art. However, this approach is unsatisfactory, as will be described, and the present invention uses another particularly effective way of correlating data containing error values.

Bayesian Estimation Techniques

In particular, a filter which applies a Bayesian estimation technique is used. For example, a Kalman filter, a particle filter or other such positioning filter can be utilised in calculating parameter solutions more effectively than a least squares fit approach. In particular, the filter can be loaded with certain assumptions and likely parameter error value distributions.

The assumptions made may be from known or measured characteristics of the navigation system 1 or its environment.

For example:

data from the IMU 14 may be used to provide each new position prediction, which can then be updated using the data from the external measurements (these are referred to by those skilled in the art as the 'predict' and 'update' steps of navigation filtering).

the known Allan variance behaviour of the receiver clock may be used to predict the likely error associated with the receiver clock (this is particularly relevant where the navigation system 1 is a relatively inexpensive system, and has a crystal oscillator having poor stability);

similarly if one or more of the transmitters are of a known type, then the navigation system may look up, in the database 18, whether there is a known clock/timing error model associated with that transmitter. If there is no error model in the database for a specific transmitter, then an assumption may be made based on the transmitter type. For example, the frequency references of cellular, digital radio and digital television transmissions are known to typically be highly stable and so the $\alpha$ values associated with such transmitter will typically vary very slowly.

timing error models may be used if the signal environment and signal characteristics are known well enough.

These assumptions constrain the Bayesian estimation filter so that the output of the filter can converge onto a particular solution. This is more effective than, for example, a least-squares-fit approach.

Use of a Reference Receiver

In the above example, reference is made to using assumptions and error models to constrain the filter. If error models are not available in the database 18, then it is also possible to obtain the error models, or actual errors from another source. Specifically, $\alpha$ values (i.e. clock drift) of an unknown transmitter can be determined by a further positioning resource such as a stationary reference receiver, separate from, but in communication with the navigation system 1. For example, the stationary reference receiver, can monitor the behaviour of transmitter broadcasts and so infer any drifting of the $\alpha_j$ values. The reference receiver may be placed in a distant optimum position where GPS lock can be maintained such that the reference receiver's local reference is locked to GPS and therefore highly stable (i.e. the reference receiver's $\epsilon_i$ values drift very slowly). Alternatively the reference receiver may use an atomic frequency standard. The variation in the $\alpha_j$ values for the local transmitters can then be communicated to the navigation system 1 such that the estimates of $\alpha_j$ in the positioning filters can be updated with a high degree of confidence rather than be estimated as part of the positioning solution. Note this method of differential corrections differs from an interferometric approach where the entire signal capture is transmitted between receivers. Here, only the alpha values and estimates of their error are transmitted, requiring a much lower communication bandwidth.

The reference receiver may alternatively broadcast its entire set of measurements to the moving receiver, allowing a differential calculation to be performed to remove the drifts in the $\alpha_j$ values completely.

Bayesian Estimation Filter and Error Handling

Thus, returning to the scenario shown in FIG. 2, but where values for receiver position and transmitter positions are only known to an accuracy of a kilometer or so, (and the corresponding initial estimates of a, are similarly degraded) the parameter values and error values still allow a filter be constrained. Estimates of the errors on these values can be overestimated to ensure stability (although the time to confident convergence will increase with the magnitude of these initial error estimates).

For larger initial errors, multiple solutions may initially be processed, such that many filters run in parallel, each with slightly different initial conditions. The filters can be scored and compared, with diverging filters discarded and high-scoring filters kept until one filter has clearly converged on the correct solution and consistently scores higher than the other filters. The scoring consists of comparing expected measurements with real measurements. If the vehicle's dynamic motion is smooth and the measurement rate is high, then dead reckoning can be employed to give a reasonable estimate of the moving vehicle's location during the next measurement. This position estimate can then be used to predict what the signal measurements will be. These estimates are then compared to the real measurements. The differences between these predicted measurements and the real measurements provide a metric for the accuracy of the initial conditions; these differences will be small consistently for filters with initial conditions close to truth, and large for filters with poor estimates of the initial conditions.

Test Scenarios

Figure 4:
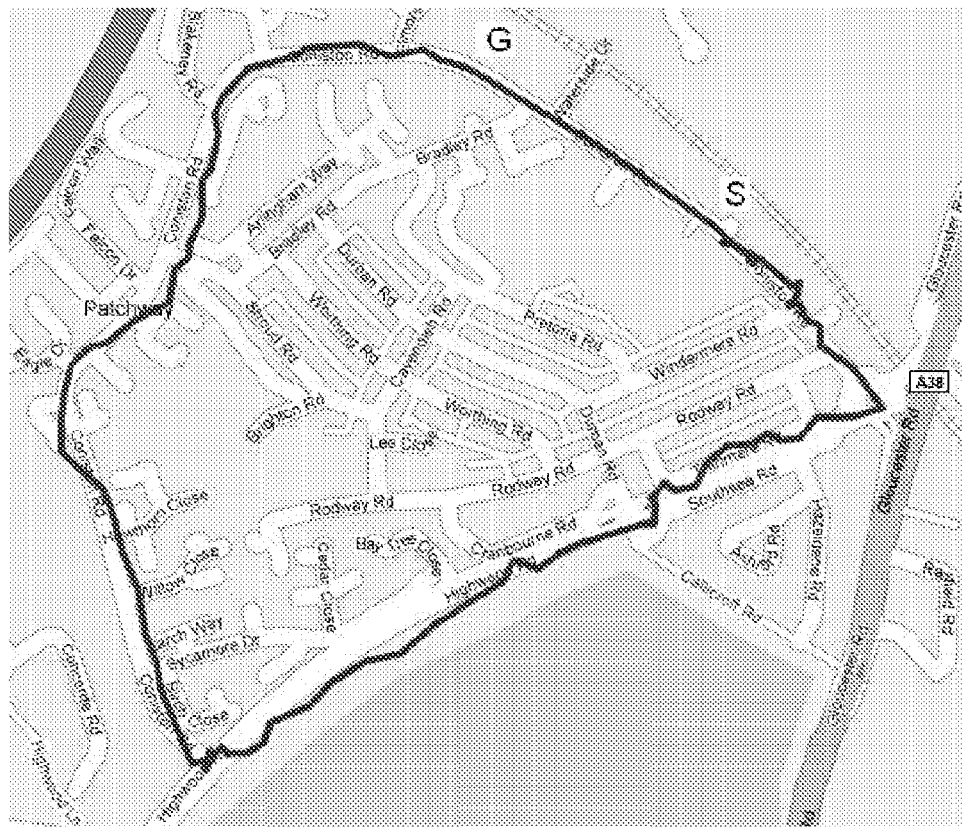
FIG. 4 shows a map of an area near Bristol in England used to test the navigation system of FIG. 1.

Referring to FIG. 4, there is shown a map of a test area near Bristol in England. The map shows the estimated position of a mobile navigation system 1 over time, and therefore the path taken by the navigation system 1.

The position of the navigation system 1 at the start, indicated by reference S, and for the first 500 meters (i.e. between reference point S and G) was determined to a high accuracy using GPS. At reference point G the navigation system 1 was GPS denied, and so had to navigate based on GSM-based opportunistic radio signals from the GSM transmitters. The locations of the GSM transmitters were known to within a few meters—as obtained through surveying of the local area. This scenario therefore represents an unchallenging situation where the filter can initially be constrained reasonably well.

The navigation system 1 moved from the known starting position S and gathered timing data from opportunistic GSM signals. Each recording was associated with a simultaneous location measurement by GPS. Timing measurements were recorded and these measurements were used along with the known navigation system 1 locations to generate initial estimates of the a and E parameters via the above Equation 1. The estimates of the parameters improved as the spatial environment was sampled, i.e. the accuracy of the system was determined by the physical separation of the measurements, not by how many were performed over time.

Once the navigation system's location could not be determined via GPS (after point G), the calibration process ended. Any remaining unknown values (for example, the navigation systems position) were then calculated by solving the resulting multiple instances of Equation 1—populated with parameter values that had been generated during the calibration process.

To solve the multiple instances of Equation 1, a Kalman filter, a particle filter, and a least-squares fit approach was used.

The track shown in FIG. 4 was produced using a Gaussian-mixture-model-based Kalman filter loaded with a dead reckoning vehicle model. The particle filter and least-squares fit approach produced similar tracks. However, the least-square fit approach was the most error-prone.

Figure 5:
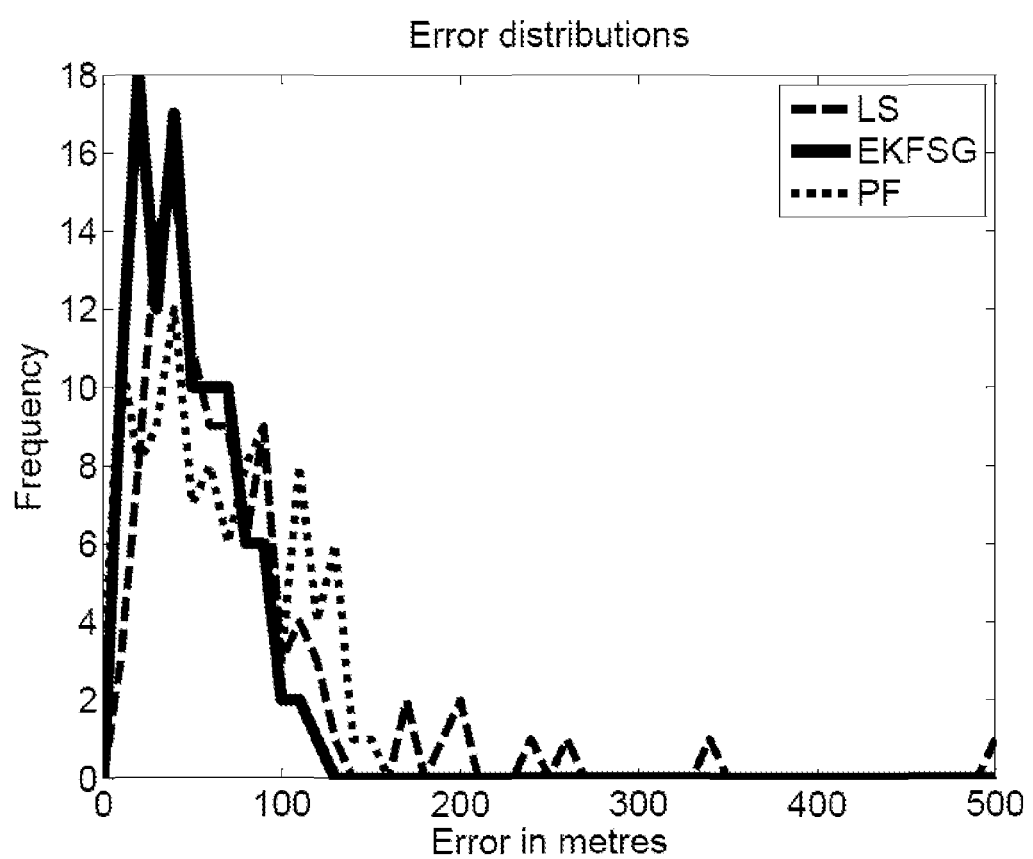
FIG. 5 shows the error distributions for different filters used in localisation of the navigation system of FIG. 1.

Referring to FIG. 5, the error distributions for a least-squares batch process (LS) a Kalman-based filter (EKFSG) and particle filter (PF) is shown. The Bayesian estimators produced better results by filtering spurious large errors caused by multipath interference using non-Gaussian error models. The least-squares batch estimate method is not robust to such highly non-Gaussian errors.

FIGS. 6 to 9 show the results of a more challenging test, where Kalman-filtered estimates of the base-station locations at various times during the more challenging test are shown. The transmitter locations were estimated with a random error in the range of 200 meters to 500 meters (the circles marking the assumed error on each position estimate have a diameter of one kilometer). The black dots represent the true transmitter locations. The 'inverted L'-shaped line represents the ground truth of a course taken by the navigation system 1. The ellipses represent the uncertainty on the locations of the transmitters and the receiver/navigation system 1. As the test proceeded (moving from FIGS. 6, to 7, to 8 then to 9) markers appear on the plots, marking the location estimate of the vehicle calculated using the process described above and also the position of GSM radio signals. The position of the receiver over the first 200 meters was correct to within 10 meters and the velocities were correct to within 1 ms$^{-1}$, and the associated uncertainty in the filter reflected this.

In the case of poorer estimates of the receiver's starting position and transmitter coordinates, a number of filters could be processed simultaneously each with slightly different initial parameters. These filters could each be scored by considering the difference in the expected measurements and the actual measurements at each new measurement step. The low scoring filters would be discarded and eventually only the filter with initial parameters closest to the true values would remain.

Figure 6:
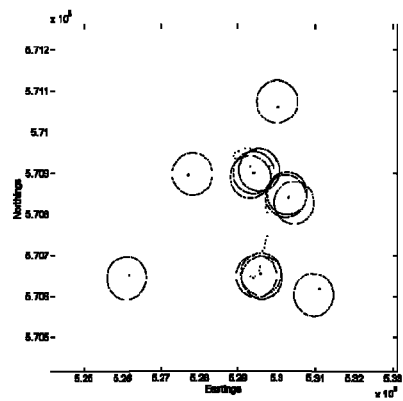
FIGS. 6 to 9 show results of a test where Kalman-filtered estimates of base-station locations are shown during movement of the navigation system of FIG. 1 relative to those base-stations.
Figure 7:
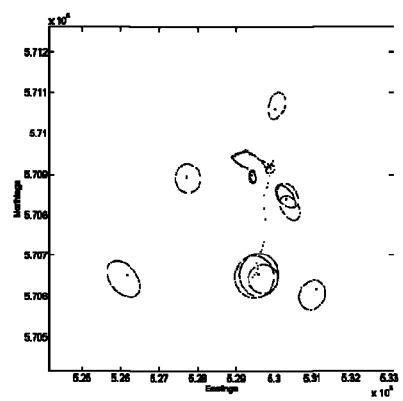
Figure 8:
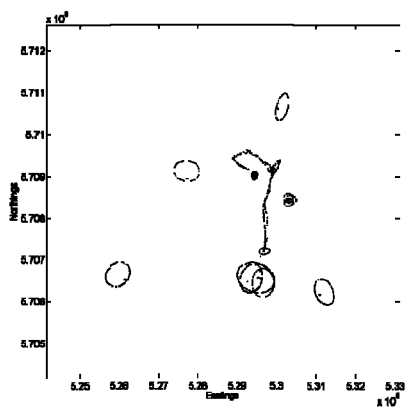
Figure 9:
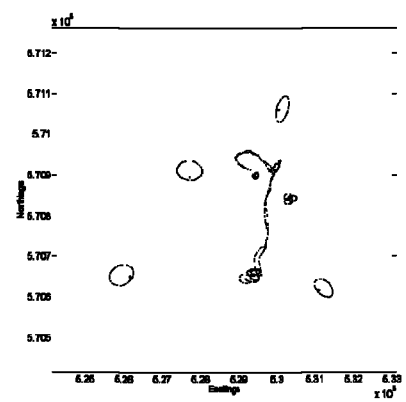

FIG. 6 shows the initial estimate of the source locations and the uncertainties associated with each in the Kalman filter. Each circle is 1000 meters in diameter, representing the initial uncertainty in the source locations. The accuracies of the initial estimates of the source locations vary in the range 200 to 500 meters. FIG. 7 shows the source location estimates after the receiver has moved ⅓ of the distance along the track; FIG. 8 the source location estimates after the receiver has moved ⅔ of the distance along the track; and FIG. 9 the source location estimates after the receiver has moved the full distance along the track. The accuracy of the estimate is dependant on the region around the source sampled by the receiver, and on the number of measurements recorded from that transmitter, with the best estimates achieved by sampling a 180 degree swath or more around the source across dozens of measurements. Some sources are represented by more than one ellipse because there is more than one transmitter at that location.

Figure 10:
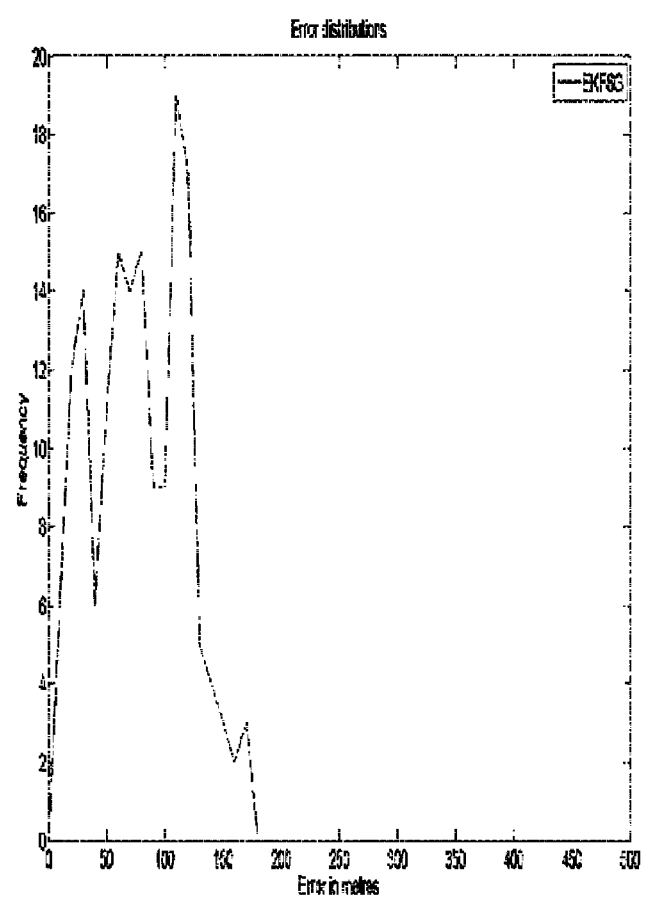
FIG. 10 shows the error distributions associated with the estimated position of the navigation system of FIG. 1 during the navigation process described with reference to FIGS. 6 to 9.

FIG. 10 shows the error distributions associated with the receiver's estimated position during the process described with reference to FIGS. 6 to 9.

Use of Other Types of Signals

So far, the navigation system 1 has been described to achieve localisation by using opportunistic radio signals derived from GSM transmitters. However, it will be appreciated that alternatives are possible—for example, the opportunistic radio signals may include television signals, WIFI signals, or signals broadcast by dedicated beacons placed by a user.

Further to this, positioning accuracy can be greatly improved by using higher-bandwidth signals as the timing errors associated with coherent multipath interference are greatly reduced. Television and 3G signals are suitable, but have a lower availability, due to the sparse distribution of television sources and the co-channel interference effects of 3G networks.

A simulation was run consisting of three signal sources (representing one television and two 3G sources) and a short calibration period to prevent the least squares estimator from diverging. Neither a reference receiver nor an IMU was used in the simulation. The accuracy of the EKFSG filter in this case is 12 meters at the 66% confidence interval, 19 meters at the 95% confidence interval and 24 meters at the 99% confidence interval, which are comparable with a GPS solution using twice as many sources. A GPS solution using only four satellites typically carries an error of around 60 meters with 99% confidence.

It will be understood that the embodiments described above are given by way of example only and are not intended to limit the invention, the scope of which is defined in the appended claims. It will also be understood that the embodiments described may be used individually or in combination.

The invention claimed is:

1. A method of estimating a position of a radio signal receiver comprising:
   estimating a position of a first stationary radio signal transmitter using a primary set of positioning resources available to the receiver;
   adding the position of the first transmitter to a secondary set of positioning resources available to the receiver; and
   using the secondary set of positioning resources to estimate the position of the receiver, wherein the receiver position estimation is carried out without two-way communication between the radio signal receiver and the first stationary radio signal transmitter and/or the primary set of positioning resources,
   wherein estimating the position of the first transmitter using a primary set of positioning resources comprises: correlating different sets of information, each set of information corresponding to a different relative position of the receiver to the first transmitter, and maintaining multiple instances of differently correlated information sets in parallel and then choosing an instance resulting in a most likely position of the transmitter.

2. A method according to claim 1, wherein each set of information comprises:
   radio signal data derived from radio signals received by the receiver from the first transmitter at each respective relative position; and
   positioning data derived from the primary set of positioning resources containing information about the position of the receiver at each respective relative position.

3. A method according to claim 1, wherein input data correlation comprises:
   applying a Bayesian estimation filter, said Bayesian estimation filter being applied to simultaneously improve position estimates of the radio signal receiver and the first stationary radio signal transmitter.

4. A method according to claim 3, wherein the Bayesian estimation filter comprises:
   a Kalman filter or a particle filter.

5. A method according to claim 3, where applying the Bayesian estimation filter comprises:
   loading the filter with error models associated with the transmitter and/or the receiver clocks.

6. A method according to claim 3, where the applying of a Bayesian estimation filter comprises:
   loading the filter with information from an inertial measurement unit about movement of the receiver relative to the transmitter.

7. A method of estimating a position of a radio signal receiver, comprising:
   estimating a position of a first stationary radio signal transmitter using a primary set of positioning resources available to the receiver;
   adding the position of the first transmitter to a secondary set of positioning resources available to the receiver; and
   using the secondary set of positioning resources to estimate the position of the receiver, wherein the receiver position estimation is carried out without two-way communication between the radio signal receiver and the first stationary radio signal transmitter and/or the primary set of positioning resources,
   wherein the receiver is arranged to receive radio signals of different types, said different types of radio signals being unsynchronised with one another and/or the radio signal receiver.

8. A method of estimating a position of a radio signal receiver, comprising:
   estimating a position of a first stationary radio signal transmitter using a primary set of positioning resources available to the receiver;
   adding the position of the first transmitter to a secondary set of positioning resources available to the receiver; and
   using the secondary set of positioning resources to estimate the position of the receiver, wherein the receiver position estimation is carried out without two-way communication between the radio signal receiver and the first stationary radio signal transmitter and/or the primary set of positioning resources,
   wherein the receiver is arranged to determine a type of radio signal being transmitted from the first transmitter by analysing the signal for radio signal characteristics.

9. A method according to claim 1, comprising:
   estimating positions of further transmitters; and
   adding their positions to the secondary set of positioning resources.

10. A method of estimating a position of a first stationary radio signal transmitter having an unknown position at a radio signal receiver comprising:
    correlating different sets of information, each set of information corresponding to a different relative position of the receiver to the first transmitter, each set of information comprising:
    radio signal data derived from radio signals received by the receiver from the first transmitter at each respective relative position;
    positioning data derived from a primary set of positioning resources available to the receiver containing information about the position of the receiver at each respective relative position; and
    maintaining multiple instances of differently correlated information sets in parallel and then choosing an instance resulting in a most likely position of the transmitter.

11. A method of estimating the position of a radio signal receiver according to claim 1, wherein the primary set of positioning resources comprises:
    a global satellite navigation system and the method comprises:
    using the secondary set of position resources to estimate the position of the receiver when the primary set of positioning resources becomes ineffectual.

12. An apparatus for estimating a position of a radio signal receiver comprising:
    means for estimating a position of a first stationary radio signal transmitter using a primary set of positioning resources available to the receiver;
    means for adding the position of the first transmitter to a secondary set of positioning resources available to the receiver; and
    means for using the secondary set of positioning resources to estimate the position of the receiver, wherein the receiver position estimation is carried out without two-way communication between the radio signal receiver and the first stationary radio signal transmitter and/or the primary set of positioning resources,
    wherein the means for estimating the position of the first transmitter using a primary set of positioning resources is configured to correlate different sets of information, each set of information corresponding to a different relative position of the receiver to the first transmitter, and maintain multiple instances of differently correlated information sets in parallel and then choosing an instance resulting in a most likely position of the transmitter.

13. A non-transitory computer program product for carrying a computer readable code arranged to control a computing device to carry out a method of estimating a position of a radio signal receiver comprising:
- estimating a position of a first stationary radio signal transmitter using a primary set of positioning resources available to the receiver;
- adding the position of the first transmitter to a secondary set of positioning resources available to the receiver; and
- using the secondary set of positioning resources to estimate the position of the receiver, wherein the receiver position estimation is carried out without two-way communication between the radio signal receiver and the first stationary radio signal transmitter and/or the primary set of positioning resources,
- wherein estimating the position of the first transmitter using a primary set of positioning resources comprises: correlating different sets of information, each set of information corresponding to a different relative position of the receiver to the first transmitter, and maintaining multiple instances of differently correlated information sets in parallel and then choosing an instance resulting in a most likely position of the transmitter.

14. A non-transitory computer program product for carrying a computer readable code arranged to control a computing device to carry out a method of estimating a position of a first stationary radio signal transmitter having an unknown position at a radio signal receiver comprising:
- correlating different sets of information, each set of information corresponding to a different relative position of the receiver to the first transmitter, each set of information comprising:
- radio signal data derived from radio signals received by the receiver from the first transmitter at each respective relative position;
- positioning data derived from a primary set of positioning resources available to the receiver containing information about the position of the receiver at each respective relative position; and
- maintaining multiple instances of differently correlated information sets in parallel and then choosing an instance resulting in a most likely position of the transmitter.

* * * * *